US011366594B2

(12) United States Patent
Raff et al.

(10) Patent No.: US 11,366,594 B2
(45) Date of Patent: Jun. 21, 2022

(54) IN-BAND EXTENT LOCKING

(71) Applicant: EMC IP Holding Company LLC, Hopkinton, MA (US)

(72) Inventors: Jason Raff, Bedford, NH (US); Shari Vietry, Merrimack, NH (US); David Bernard, Westford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/034,547

(22) Filed: Sep. 28, 2020

(65) Prior Publication Data

US 2022/0100398 A1   Mar. 31, 2022

(51) Int. Cl.
*G06F 3/06* (2006.01)

(52) U.S. Cl.
CPC .......... *G06F 3/0622* (2013.01); *G06F 3/0634* (2013.01); *G06F 3/0655* (2013.01); *G06F 3/0679* (2013.01); *G06F 3/0637* (2013.01)

(58) Field of Classification Search
CPC .. G06F 16/2343; G06F 16/1774; G06F 3/067; G06F 3/0622; G06F 3/0617; G06F 3/0637
See application file for complete search history.

(56) References Cited

U.S. PATENT DOCUMENTS

| 7,409,525 | B1 | 8/2008 | Clark et al. |
| 7,774,645 | B1 | 8/2010 | Clark et al. |
| 2008/0065644 | A1* | 3/2008 | Pasupuleti .......... G06F 16/2477 |
| 2019/0235756 | A1* | 8/2019 | Cheng .................. G06F 3/0634 |

* cited by examiner

*Primary Examiner* — Reginald G Bragdon
*Assistant Examiner* — Thanh D Vo
(74) *Attorney, Agent, or Firm* — BainwoodHuang

(57) ABSTRACT

Techniques for in-band locking of extents containing multiple pages of shared non-volatile data storage are disclosed in which inter-node lock request messages indicate both an individual page for which a lock is requested and the multi-page extent that contains that page. A page lock or an extent lock is granted to the requesting node based on the time since the last access to the extent by the node to which the request was sent. A generation number may be maintained in each node and stored in the per-extent lock table entries and per-page lock table entries such that pages accessed by a node within an extent while the extent is in extent-locked access mode may subsequently be accessed by the node during a page-locked access mode for the extent occurring after the extent-locked access mode ends based on page locks created by the node during the extent-locked access mode.

14 Claims, 6 Drawing Sheets

| | |
|---|---|
| LOCAL ACCESS TIMESTAMP | 202 |
| GENERATION NUMBER | 204 |
| STATE | 206 |
| ACCESS LEVEL | 208 |

EXTENT LOCK ENTRY 200 (IN PER-EXTENT LOCK TABLE)

Fig. 2

IN-BAND EXTENT LOCKING

TECHNICAL FIELD

The present disclosure relates generally to intelligent data storage systems that share non-volatile data storage between multiple nodes, and more specifically to technology for providing in-band locking of extents containing multiple pages of shared non-volatile data storage.

BACKGROUND

Multi-node data storage systems are arrangements of hardware and software that include multiple nodes, sometimes referred to as storage processors, that are each communicably coupled to a shared set of non-volatile data storage drives, such as solid state drives and/or magnetic disk drives. In some multi-node data storage systems, multiple nodes may simultaneously be "active", in that they concurrently service host I/O requests received from physical and/or virtual host machines ("hosts"). The host I/O requests received and processed by a node may specify one or more storage objects (e.g. logical units ("LUNs"), and/or files etc.) that are hosted by the storage system and store user data that is written and/or read by the hosts. Each node independently executes software that processes host I/O requests and performs various data processing tasks to organize and store user data received from the hosts onto the shared non-volatile data storage drives.

In order to prevent data corruption when multiple nodes of the data storage system attempt to simultaneously write to the same page of shared non-volatile data storage, individual page locks may be provided that indicate which specific node currently holds the lock for a given page and is therefore permitted to access that page without interference by the other node(s). Locking of pages of shared non-volatile data storage is coordinated within the data storage system by exchanging messages between the individual nodes.

SUMMARY

In some previous data storage systems, the number of messages exchanged between nodes to provide page locking has at times become sufficiently large enough to introduce significant latency to the processing of received host I/O requests by the data storage system. Such additional latency in processing host I/O requests negatively impacts the performance of the data storage system with regard to various data storage services provided by the data storage system, and may also degrade the performance of hosts and/or applications that issue the host I/O requests.

To address the above described and/or other shortcomings of previous technologies, new technology is disclosed herein that provides in-band locking of extents that each contain multiple pages of shared non-volatile data storage. The disclosed technology sends, e.g. from a first node in a data storage system to a second node in the data storage system, a first lock request message that requests permission to access a first page of the shared non-volatile data storage. The first lock request message indicates both the first page of non-volatile data storage and an extent of non-volatile data storage that contains the first page of non-volatile data storage. In some embodiments, the extent of non-volatile data storage is one of multiple extents of non-volatile data storage within the data storage system that are shared by the first node and the second node. The first node subsequently receives an extent lock grant message from the second node responding to the first lock request message, referred as the first extent lock grant message. The first extent lock grant message grants a lock on the extent of non-volatile data storage to the first node. The first node then accesses, in response to receipt of the first extent lock grant message from the second node, the first page of non-volatile data storage and at least a second page of non-volatile data storage other than the first page of non-volatile data storage that is also contained within the extent of non-volatile data storage. The first node accesses both the first page of non-volatile data storage and the second page of non-volatile data storage contained within the extent of non-volatile data storage in response to the first extent lock grant message without the first node sending a lock request message to the second node subsequent to receipt of the first extent lock grant message by the first node from the second node.

In some embodiments, the first node locates an extent lock entry corresponding to the extent of non-volatile data storage in a per-extent lock table contained in the first node, and in response to the first extent lock grant message, modifies the extent lock entry corresponding to the extent of non-volatile data storage in the per-extent lock table contained in the first node to include an indication that an extent lock for the extent of non-volatile data storage is currently held by the first node. In such embodiments, the first node accesses both the first page of non-volatile data storage and the second page of non-volatile data storage contained within the extent of non-volatile data storage in response to the first extent lock grant message by accessing both the first page of non-volatile data storage and the second page of non-volatile data storage in response to the indication in the extent lock entry corresponding to the extent of non-volatile data storage that the extent lock for the extent of non-volatile data storage is currently held by the first node.

In some embodiments, the first node modifies the extent lock entry corresponding to the extent of non-volatile data storage to include the indication that the extent lock for the extent of non-volatile data storage is currently held by the first node at least in part by modifying the extent lock entry corresponding to the extent of non-volatile data storage to indicate that the extent of non-volatile data storage is currently being accessed in extent-locked access mode, and to further indicate that the first node currently has exclusive access to the extent of non-volatile data storage.

In some embodiments, accessing of both the first page of non-volatile data storage and the second page of non-volatile data storage contained within the extent of non-volatile data storage by the first node in response to the first extent lock grant message, while the extent of non-volatile data storage is currently being accessed in extent-locked access mode, further includes the first node modifying a page lock entry corresponding to the first page of non-volatile data storage in a per-page lock table contained in the first node to include an indication that a page lock for the first page of non-volatile data storage is also currently held by the first node, and also modifying a page lock entry corresponding to the second page of non-volatile data storage in the per-page lock table in the first node to include an indication that a page lock for the second page of non-volatile data storage is also currently held by the first node.

In some embodiments, an extent lock generation number may be maintained by the first node, and modifying the extent lock entry corresponding to the extent of non-volatile data storage to include the indication that the extent lock for the extent of non-volatile data storage is currently held by the first node may further include the first node storing a copy of the current value of the generation number maintained within the first node into the extent lock entry corresponding to the extent of non-volatile data storage. In such embodiments, modifying the page lock entry corresponding to the first page of non-volatile data storage in a per-page lock table in the first node to include the indication that the page lock for the first page of non-volatile data storage is also currently held by the first node may further include the first node also storing a copy of the current value of the generation number maintained within the first node in the page lock entry corresponding to the first page of non-volatile data storage in the per-page lock table in the first node. Further in such embodiments, modifying the page lock entry corresponding to the second page of non-volatile data storage in the per-page lock table in the first node to include the indication that the page lock for the second page of non-volatile data storage is also currently held by the first node may further include also storing the current value of the generation number maintained within the first node in the page lock entry corresponding to the second page of non-volatile data storage in the per-page lock table in the first node.

In some embodiments, the extent lock generation number within each node is incremented each time the node sends an extent lock grant message. For example, the extent lock generation number within the first node may be incremented each time an extent lock grant message is transmitted from the first node to the second node.

In some embodiments of the disclosed technology, a second lock request message may be received by the first node from the second node, the second lock request message requesting permission to access a third page of non-volatile data storage contained within the extent of non-volatile data storage. The second lock request message indicates both the third page of non-volatile data storage and the extent of non-volatile data storage. In such embodiments, in response to the second lock request message, the first node may determine whether at least a threshold period of time has elapsed since any page in the extent of non-volatile data storage was last accessed by the first node. In response to determining that less than the threshold period of time has elapsed since the extent of non-volatile data storage was last accessed by the first node, the first node i) modifies the extent lock entry corresponding to the extent of non-volatile data storage in the per-extent lock table in the first node to include an indication that the extent of non-volatile data storage is currently being accessed in page-locked access mode, ii) modifies a page lock entry corresponding to the third page of non-volatile data storage in the per-page lock table in the first node to include an indication that a page lock for the third page of non-volatile data storage is currently held by the second node, and iii) sends a page lock grant message from the first node to the second node granting the page lock for the third page of non-volatile data storage to the second node.

In some embodiments, after modifying the extent lock entry corresponding to the extent of non-volatile data storage in the per-extent lock table in the first node to include an indication that the extent of non-volatile data storage is currently being accessed in page-locked access mode, the first node accesses the first page and the second page within the extent of non-volatile data storage without contacting the second node, based on the indications that the page locks for the first page and the second page are currently held by the first node that were previously included in the per-page locking table in the first node while i) the extent was being accessed in extent-locked access mode, and ii) the extent lock for the extent of non-volatile data storage was held by the first node.

In some embodiments, after modifying the extent lock entry corresponding to the extent of non-volatile data storage in the per-extent lock table in the first node to include an indication that the extent of non-volatile data storage is currently being accessed in page-locked access mode, the first node only accesses pages within the extent of non-volatile data storage without contacting the second node based on indications of page locks held by the first node in the per-page locking table in the first node that are contained within entries of the per-page locking table in the first node that also contain generation numbers that match the generation number stored in the extent lock entry corresponding to the extent of non-volatile data storage.

In some embodiments, the first node receives a third lock request message from the second node, and the third lock request message requests permission to access a fourth page of non-volatile data storage contained within the extent of non-volatile data storage. The third lock request message indicates both the fourth page of non-volatile data storage and the extent of non-volatile data storage. In such embodiments, in response to the third lock request message, the first node determines whether at least the threshold period of time has elapsed since any page within the extent of non-volatile data storage was last accessed by the first node. In response to determining that at least the threshold period of time has elapsed since the extent of non-volatile data storage was last accessed by the first node, the first node i) modifies the extent lock entry corresponding to the extent of non-volatile data storage in the per-extent lock table in the first node to include an indication that the extent lock for the extent of non-volatile data storage is currently held by the second node, ii) increments the extent lock generation number within the first node, and iii) sends a second extent lock grant message from the first node to the second node granting the extent lock on the extent of non-volatile data storage to the second node.

In some embodiments, the first node modifies the extent lock entry corresponding to the extent of non-volatile data storage in the per-extent lock table in the first node to include the indication that the extent lock for the extent of non-volatile data storage is currently held by the second node at least in part by modifying the extent lock entry corresponding to the extent of non-volatile data storage in the per-extent lock table in the first node to include an indication that the extent of non-volatile data storage is currently being accessed in extent-locked access mode and an indication that the first node has no access to the extent of non-volatile data storage.

Embodiments of the disclosed technology may provide significant advantages over previous technologies. For example, by enabling nodes to access more than one page within an extent after obtaining an extent lock on the extent, without requiring additional exchanges of lock request and lock grant messages between the nodes, the disclosed technology may reduce the overall amount of messaging performed to support locking of shared non-volatile data storage within the data storage system, thus reducing host I/O request processing latency and improving data storage system performance. In addition, by indicating both the page of non-volatile data storage for which a lock is requested and the extent containing the page of non-volatile data storage in each lock request message, and then responding to each lock request message with a response indicating that either only the page lock or the entire extent lock is granted, the disclosed technology piggy-backs extent locking information onto the same messages that would otherwise be used to establish only page locks. In this way the disclosed technology provides in-band extent locking without introducing additional extent lock specific messages that must be transmitted between the nodes, thus avoiding further limiting the latency introduced while locking the shared non-volatile data storage. Further, by providing the ability for a node to use page locks during page-locked access mode that were previously acquired during extent-locked access mode without having to send lock request messages to the other node, the disclosed technology further advantageously reduces the total amount of inter-node communications that is required to support locking.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed upon illustrating the principles of the disclosed technology.

FIG. 2 is a block diagram showing an example format of an extent lock entry in a per-extent lock table in some embodiments;

DETAILED DESCRIPTION

Figure 1:
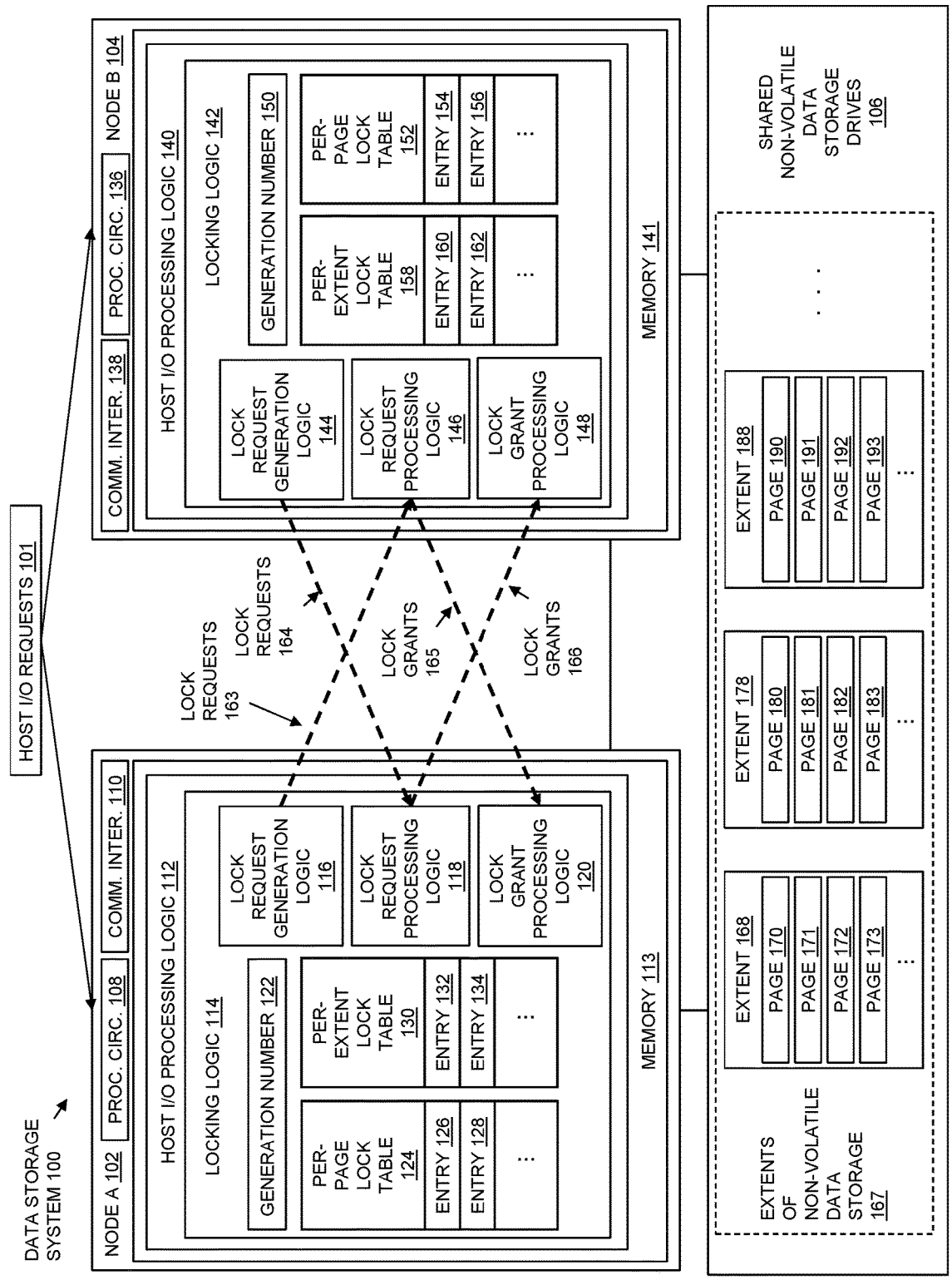
FIG. 1 is a block diagram showing an example of a multi-node data storage system in which an example of the disclosed technology is embodied.

Embodiments of the invention will now be described with reference to the figures. The embodiments described herein are provided only as examples, in order to illustrate various features and principles of the disclosed technology, and the invention is broader than the specific embodiments described herein.

Embodiments of the technology disclosed herein may provide improvements over previous technologies by locking extents that each contain multiple pages of shared non-volatile data storage based on lock grants issued in response to lock request messages that indicate both an individual page for which a lock is requested and a multi-page extent that contains that page. In response to receipt of an extent lock grant message, a node may access both the page indicated in the request and one or more other pages contained in the extent without having to send additional lock request messages to the other node.

A page lock or an extent lock may be granted to the requesting node by the node that receives the lock request message. Whether or not an extent lock is granted for an extent may be based on an amount of time that has elapsed since the last access to the extent by the node to which the request was sent, e.g. such that the extent lock is granted to the requesting node in response to a determination that the amount of time that has elapsed since the last access to the extent by the receiving node is at least as large as a threshold period of time. In the case where the amount of time that has elapsed since the last access to the extent by the node to which the request was sent is less than the threshold period of time, the extent lock is not granted, and instead only the page lock on the page indicated by the request is granted.

In some embodiments, when a node holding a lock on an extent receives a lock request for a page contained in that extent from another node, and does not grant the extent lock to the requesting node, it instead grants the page lock on the page indicated by the request, and also transitions the extent to a page-locked access mode, in which pages within the extent are only accessed by the node based on individual per-page locks, some of which may already be held by the node, and some of which may subsequently be obtained by the node. A generation number may be maintained in each node, and incremented each time a node sends an extent lock grant message. Copies of the current generation number of a node may be stored in extent lock entries within the per-extent lock table of a node when extent locks for corresponding extents are granted to the node. Copies of the current generation number of a node may also be stored in page lock entries in the per-page lock table of the node when page locks become held by the node, e.g. when page locks become held by the node when the node accesses the corresponding pages while the extent lock for the extent that contains the corresponding pages is held by the node (i.e. while the extent is being accessed in the extent-locked access mode). As a result, pages accessed within an extent while the extent is in the extent-locked access mode may subsequently be accessed by a node during the subsequent page-locked access mode for the extent occurring after the extent-locked access mode ends for the extent, without having to contact the other node, based on page locks that were created during the extent-locked access mode and stored in the corresponding page lock entries in the per-page lock table together with generation numbers that match the generation number stored in the corresponding extent lock entry in the per-extent lock table.

FIG. 1 is a block diagram showing an operational environment for the disclosed technology, including an example of a multi-node Data Storage System 100 in which the disclosed technology is embodied. The Data Storage System 100 processes Host I/O Requests 101 received from some number of physical and/or virtual host computing devices, referred to as "hosts". The hosts may access data storage provided by Data Storage System 100 over one or more networks, such as a local area network (LAN), and/or a wide area network (WAN) such as the Internet, etc.

Data Storage System 100 includes multiple nodes, sometimes referred to as "storage processors", each of which concurrently processes host I/O requests directed to the Data Storage System 100, in what is sometimes referred to as an "Active/Active" storage system configuration. In the example of FIG. 1, Data Storage System 100 includes two nodes, i.e. Node A 102 and Node B 104. Node A 102 and Node B 104 may be considered and referred to as peer nodes to each other. Those skilled in the art will recognize that the disclosed technology is not limited to embodiments with any specific number of nodes, and that the disclosed technology may alternatively be embodied in data storage systems having more than two nodes.

Each node in Data Storage System 100 may be communicably coupled over one or more computer networks, buses, or the like, to the other nodes in Data Storage System 100, to the hosts that issue Host I/O Requests 101, and also to the Shared Non-Volatile Data Storage Drives 106, e.g. through one or more communication interfaces such as Communication Interfaces 110 in Node A 102 and Communication Interfaces 138 in Node B 104. No particular hardware configuration is required, and each node may be embodied as any specific type of device that is capable of processing those host I/O requests of Host I/O Requests 101 that it receives from the hosts (e.g. I/O read and I/O write requests, etc.), and of persistently storing and retrieving user data indicated by the Host I/O Requests 101.

Shared Non-Volatile Data Storage Drives 106 may include physical data storage drives such as solid state drives, magnetic disk drives, hybrid drives, optical drives, and/or other specific types of drives. Shared Non-Volatile Data Storage Drives 106 may be directly physically connected to and/or contained within the nodes of Data Storage System 100, and/or may be communicably connected to the nodes of Data Storage System 100 by way of one or more networks.

A memory in each node stores program code that is executable on processing circuitry of the node. In the example of FIG. 1, Memory 113 in Node A 102 stores program code that is executable on Processing Circuitry 108, and Memory 141 in Node B 104 stores program code that is executable on Processing Circuitry 136. The memory in each node may include volatile memory, e.g. DRAM, and/or other types of program storage. The processing circuitry in each node may include or consist of one or more microprocessors, e.g. central processing units (CPUs), multi-core processors, chips and/or assemblies, and associated circuitry.

The processing circuitry and memory in each node together form control circuitry, which is configured and arranged to carry out various methods and functions as described herein. The memory in each node stores a variety of software components that may be provided in the form of executable program code. For example, Memory 113 may include software components such as Host I/O Processing Logic 112, and Memory 141 may include software components such as Host I/O Processing Logic 141. When program code in the memory of a node is executed by the processing circuitry of that node, the processing circuitry is caused to carry out the operations of the software components. Although certain software components are shown in the Figures and described herein for purposes of illustration and explanation, those skilled in the art will recognize that the nodes may include various other software components, including but not limited to an operating system, various applications, other specific processes, etc.

During operation, user data indicated by write I/O requests in Host I/O Requests 101 that are received by Node A 102 is written to pages of non-volatile data storage in Shared Non-Volatile Data Storage Drives 106 by Host I/O Processing Logic 112. Similarly, user data indicated by write I/O requests in Host I/O Requests 101 that are received by Node B 101 are written to pages of non-volatile data storage in Shared Non-Volatile Data Storage Drives 106 by Host I/O Processing Logic 142. In order to write user data to a page of non-volatile data storage, the host I/O processing logic of a node must first ensure that the node holds a lock on that page of non-volatile data storage that ensures that the node is the only node in the data storage system that can access the page, in order to prevent the other node from accessing the page of non-volatile data storage during the write operation. Accordingly, whenever the host I/O processing logic of a node needs to write to a page of Shared Non-Volatile Data Storage Drives 106, it uses its locking logic to determine whether i) a lock on the page is currently held by the node, or ii) a lock request message must be sent to the other node to obtain a lock on the page. For example, whenever Host I/O Processing Logic 112 of Node 102 needs to write to a page of Shared Non-Volatile Data Storage Drives 106, it uses Locking Logic 114 to determine whether i) a lock on the page is currently held by Node A 102, or ii) a lock request message must be sent to Node B 104 to obtain a lock on the page.

As shown in FIG. 1, some or all of the pages of non-volatile data storage in Shared Non-Volatile Data Storage Drives 106 are organized into multi-page extents of non-volatile data storage, e.g. Extents of Non-Volatile Data Storage 167. For example, each page may consist of a 4 KB portion of contiguous non-volatile data storage, and each extent may consist of a terabyte of non-volatile data storage. Other sized pages and extents may be used in the alternative. Each extent has a unique extent number. In some embodiments, each extent corresponds to a range or region of contiguous logical addresses within a shared logical address space that is accessible to both Node A 102 and Node B 104. Each page is addressable by a unique corresponding Logical Block Address (LBA). The LBA of each page may be contained within the shared logical address space that is accessible to both Node A 102 and Node B 104. In some embodiments, each extent corresponds to a logical volume of non-volatile data storage, and the LBAs of the pages within a given extent are logical addresses within that extent.

Any specific number of extents may be contained in Shared Non-Volatile Data Storage Drives 106. In the example of FIG. 1, Extents of Non-Volatile Data Storage 167 contains some number of extents including Extent 168, Extent 178, Extent 188, and so on. Extent 168 is shown containing pages including Page 170, Page 171, Page 172, Page 173, and so on. Extent 178 is shown containing pages including Page 180, Page 181, Page 182, Page 183, and so on, and Extent 188 is shown containing pages including Page 190, Page 191, Page 192, Page 193, and so on.

The locking logic in each node may include lock request generation logic, lock request processing logic, and lock grant processing logic. For example, Locking Logic 114 in Node A 102 includes Lock Request Generation Logic 116, Lock Request Processing 118, and Lock Grant Processing Logic 120, and Locking Logic 142 includes Lock Request Generation Logic 144, Lock Request Processing Logic 146, and Lock Grant Processing Logic 148.

The lock request generation logic in each node determines whether a lock request message needs to be sent to the other node prior to the host I/O processing logic accessing a given page of non-volatile data storage that needs to be accessed, e.g. to store user data received in one or more of the host I/O requests. If a lock request message needs to be sent, the lock request generation logic sends the necessary lock request message to the other node. Each lock request message includes both i) an identifier (e.g. LBA) of the page of non-volatile data storage that needs to be accessed by the sending node, and ii) an identifier (e.g. an extent identifier) of the extent that contains the page that needs to be accessed.

In the example of FIG. 1, for each page of non-volatile data storage that Host I/O Processing Logic 112 needs to access, Lock Request Generation Logic 116 determines whether a lock request message needs to be sent to Node B 104 prior to Host I/O Processing Logic 112 accessing the page. If such a lock request message needs to be sent, Lock Request Generation Logic 116 sends the lock request message to Node B 104, e.g. as one of Lock Requests 163. Similarly, for each page of non-volatile data storage that Host I/O Processing Logic 140 needs to access, Lock Request Generation Logic 144 determines whether a lock request message needs to be sent to Node A 102 prior to Host I/O Processing Logic 140 accessing the page. If such a lock request message needs to be sent, Lock Request Generation Logic 144 sends the lock request message to Node A 102, e.g. as one of Lock Requests 164.

The lock request processing logic in each node processes the lock request messages received from the other node. When a lock request message is received by the lock request processing logic of a node, the lock request processing logic determines whether to send a page lock grant message to the requesting node granting the requesting node the lock for the page indicated in the request, or an extent lock grant message granting the requesting node the lock for the extent indicated in the request that contains the page. Accordingly, for each one of the Lock Requests 163, Lock Request Processing Logic 146 determines whether to send a lock grant message to Node A 102 that is a page lock grant message granting the lock on the page indicated in the request, or a lock grant message that is an extent lock message granting the lock on the extent indicated in the request. Lock grant messages sent by Lock Request Processing Logic 146 to Node A 102 are shown in FIG. 1 by Lock Grants 165. Similarly, for each one of the Lock Requests 164, Lock Request Processing Logic 118 determines whether to send a lock grant message to Node B 104 that is a page lock message granting the lock on the page indicated in the request, or a lock grant message that is an extent lock message granting the lock on the extent indicated in the request. Lock grant messages sent by Lock Request Processing Logic 118 to Node B 104 are shown in FIG. 1 by Lock Grants 166.

The lock grant processing logic in each node processes the lock grant messages received from the other node. When a lock grant message is received by the lock grant processing logic of a node, the lock grant processing logic determines whether the lock grant message grants a page lock or an extent lock. The lock grant processing logic then modifies the appropriate corresponding entries for the page and/or extent in the per-page lock table and/or per-extent lock table of the node. Accordingly, when each lock grant message in Lock Grants 165 is received by Lock Grant Processing Logic 120, Lock Grant Processing Logic 120 determines whether the lock grant message grants a page lock or an extent lock. Lock Grant Processing Logic 120 then modifies the appropriate corresponding entries for the page and/or extent Per-Page Lock Table 124 and/or Per-Extent Lock Table 130. Similarly, when each lock grant message in Lock Grants 166 is received by Lock Grant Processing Logic 148, Lock Grant Processing Logic 148 determines whether the lock grant message grants a page lock or an extent lock. Lock Grant Processing Logic 148 then modifies the appropriate corresponding entries for the page and/or extent Per-Page Lock Table 152 and/or Per-Extent Lock Table 158.

The per-extent lock table in each node contains multiple extent lock entries, with each extent lock entry corresponding to an individual one of the extents in Shared Non-Volatile Data Storage Drives 106. The per-extent lock table in each node may be a hash table, with the index of each extent lock entry being obtained by applying a hash function to the extent number of the corresponding extent. Each extent lock entry in the per-extent lock table of a node stores information including an indication of whether the node currently holds the extent lock on the corresponding extent. Accordingly, the Per-Extent Lock Table 130 in Node A 102 includes multiple extent lock entries, shown by Entry 132, Entry 134, and so on, and each extent lock entry in Per-Extent Lock Table 130 corresponds to an individual one of the extents in Shared Non-Volatile Data Storage Drives 106. Each extent lock entry in Per-Extent Lock Table 130 stores information regarding the corresponding extent including an indication of whether Node A 102 currently holds the extent lock on the extent corresponding to the extent lock entry. Similarly, the Per-Extent Lock Table 158 in Node B 104 includes multiple extent lock entries, shown by Entry 160, Entry 162, and so on, and each extent lock entry in Per-Extent Lock Table 158 corresponds to an individual one of the extents in Shared Non-Volatile Data Storage Drives 106. Each extent lock entry in Per-Extent Lock Table 158 stores information regarding the corresponding extent including an indication of whether Node B 102 currently holds the extent lock on the extent corresponding to the extent lock entry.

The per-page lock table in each node contains multiple page lock entries, with each entry corresponding to an individual one of the pages in Shared Non-Volatile Data Storage Drives 106. The per-page lock table in each node may be a hash table, with the index of each page lock entry in the per-page lock table being obtained by applying a hash function to the LBA of the corresponding page. Each page lock entry in the per-page lock table of a node stores information including an indication of whether the node currently holds the page lock on the corresponding page. Accordingly, the Per-Page Lock Table 124 in Node A 102 includes multiple page lock entries, shown by Entry 126, Entry 128, and so on, and each page lock entry in Per-Page Lock Table 124 corresponds to an individual one of the pages in Shared Non-Volatile Data Storage Drives 106. Each page lock entry in Per-Page Lock Table 124 stores information regarding the corresponding page including an indication of whether Node A 102 currently holds the page lock on the page corresponding to the page lock entry. Similarly, the Per-Page Lock Table 152 in Node B 104 includes multiple page lock entries, shown by Entry 154, Entry 156, and so on, and each page lock entry in Per-Page Lock Table 152 corresponds to an individual one of the pages in Shared Non-Volatile Data Storage Drives 106. Each page lock entry in Per-Page Lock Table 152 stores information regarding the corresponding page including an indication of whether Node B 102 currently holds the page lock on the page corresponding to the page lock entry.

Each node may also include a generation number that is incremented each time an extent lock grant message is sent from the node to the other node. Accordingly, Node A 102 includes Generation Number 122 that is incremented each time an extent lock grant message is sent from Node A 102 to Node B 104. Similarly, Node B 104 includes Generation Number 150 that is incremented each time an extent lock grant message is sent from Node B 104 to Node A 102.

Copies of the current generation number of each node are stored in extent lock entries within the per-extent lock table of the node when extent locks on the corresponding extents are granted to the node. Accordingly, a copy of Generation Number 122 is stored to individual extent lock entries of Per-Extent Lock Table 130 each time the extent lock for the extent corresponding to the extent lock entry is granted to Node A 102. Similarly, a copy of Generation Number 150 is stored to individual extent lock entries of Per-Extent Lock Table 158 each time the extent lock for the extent corresponding to the extent lock entry is granted to Node B 104.

Copies of the current generation number of a node are stored in page lock entries in the per-page lock table of the node when page locks become held by the node, e.g. when page locks are obtained by the node when the node accesses the corresponding pages while the extent that contains the corresponding pages is being accessed by the node in the extent-locked access mode. Accordingly, a copy of Generation Number 122 of Node A 102 is stored into page lock entries in Per-Page Lock Table 124 when the page locks on the corresponding pages become held by Node A 102, e.g. when page locks are obtained by Node A 102 when Node A 102 accesses the corresponding pages while the extent that contains the corresponding pages is being accessed by Node A 102 in the extent-locked access mode and Node A 102 holds the lock on the extent. Similarly, a copy of Generation Number 150 of Node B 104 is stored into page lock entries in Per-Page Lock Table 152 when the page locks on the corresponding pages become held by Node B 104, e.g. when page locks are obtained on the corresponding pages by Node B 104 when Node B 104 accesses the corresponding pages while the extent that contains the corresponding pages is being accessed by Node B 104 in the extent-locked access mode while Node B 104 holds the lock on the extent.

As a result of the disclosed storing of the generation number of a node into each node's extent lock entries and page lock entries, pages within an extent that are locked and accessed by a node while the node holds the extent lock on the extent and the extent is accessed in the extent-locked access mode may subsequently be accessed by the same node when the extent is later being accessed in the page-locked access mode after the extent-locked access mode is ended for the extent (e.g. during a page-locked access mode for the extent entered in response to receipt of a lock request from the other node indicating a page within the extent), without having to request a lock from the other node, based on the page locks held by the node that were obtained while the node held the extent lock during the extent-locked mode of access for the extent, indications of which were stored in page lock entries in the node's per-page lock table together with generation numbers that match the generation number that was stored in the corresponding extent lock entry in the node's per-extent lock table when the node initially obtained the extent lock and entered the extent-locked access mode for the extent.

FIG. 2 is a block diagram showing an example format of the individual extent lock entries in the per-extent lock table of a node in some embodiments. For example, Extent Lock Entry 200 may be one of the extent lock entries in the Per-Extent Lock Table 130 of Node A 102. The format of the extent lock entries in Per-Extent Lock Table 158 may be the same as shown in FIG. 2.

In the example of FIG. 2, Extent Lock Entry 200 includes a Local Access Timestamp 202 into which the local node (e.g. Node A 102) stores the current time each time the node accesses any page contained within the corresponding extent. When a lock request message is received from the remote node (e.g. Node B 104) indicating one of the pages contained in the corresponding extent, the time at which the lock request message is received may be compared with the last value previously stored in Local Access Timestamp 202, which indicates when any page in the extent was last accessed by the local node. In response to determining that the amount of time that has elapsed since the last time the extent was accessed by the local node exceeds a threshold period of time (e.g. 300 seconds), the local node may send an extent lock grant message to the remote node that grants the lock on the extent to the remote node.

Extent Lock Entry 200 further includes a Generation Number 204 into which the local node stores a copy of the current generation number of the local node at the time that the local node obtains the extent lock for the corresponding extent. Extent Lock Entry 200 further includes a State 206 that indicates whether the corresponding extent is currently being accessed in extent-locked access mode or page-locked access mode. When the corresponding extent is being accessed in extent-locked access mode (e.g. State=ExtentLocked), the extent lock for the corresponding extent is currently held by either the local or the remote node in the data storage system, e.g. by either by Node A 102 or Node B 104. When the corresponding extent is being accessed in page-locked access mode (e.g. State=PageLocked), neither Node A 102 nor Node B 104 currently holds the extent lock for the corresponding extent, and individual pages must be accessed based on page locks held on individual pages as indicated by corresponding entries in the per-page lock tables of the nodes. Extent Lock Entry 200 further includes Access Level 208, which indicates the local node's current access level with regard to the pages contained in the corresponding extent, e.g. while the corresponding extent is being accessed in the extent-locked access mode. For example, when the Extent Lock Entry 200 is modified to indicate that the extent lock for the corresponding extent is currently held by the local node, the value of State 206 may be set to ExtentLocked, and the value of Access Level 208 may be set to EXCLUSIVE, thus indicating that the extent lock on the corresponding extent is currently held by the local node. In another example, when the Extent Lock Entry 200 is modified to indicate that the extent lock for the corresponding extent is currently held by the remote node, the value of State 206 may be set to ExtentLocked, and the value of Access Level 208 may be set to NONE, thus indicating that the extent lock on the corresponding extent is currently held by the remote node.

Figure 3:
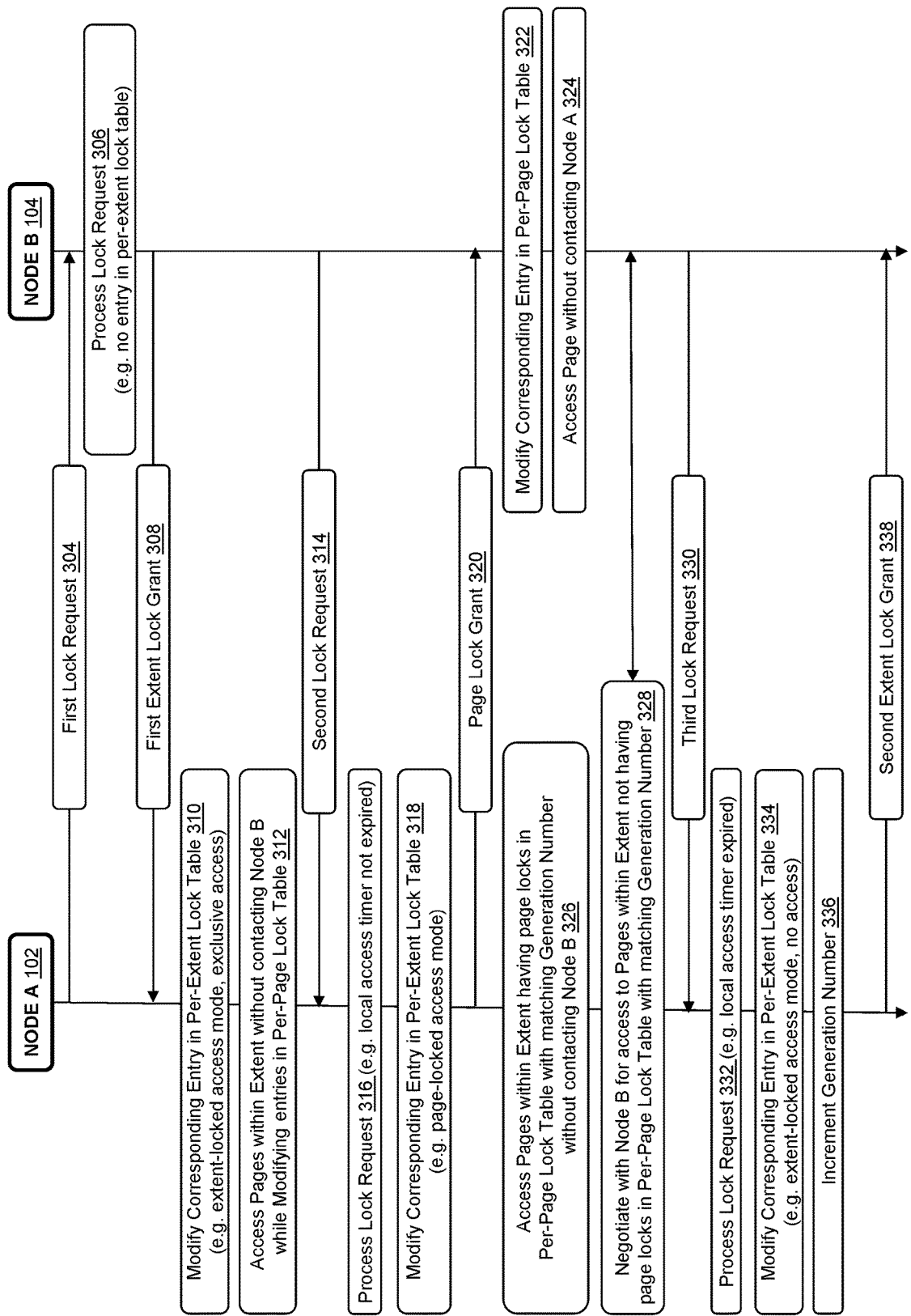
FIG. 3 is a sequence diagram showing an example of the operation of a first node and a second node of a multi-node data storage system in some embodiments.

FIG. 3 is a sequence diagram showing an example of the operation of a first node and a second node of a multi-node data storage system in some embodiments. In the example of FIG. 3, the first node is Node A 102, and the second node is Node B 104. Node A 102 sends a first lock request message, e.g. First Lock Request 304, to Node B 104. First Lock Request 304 requests permission for Node A 102 to exclusively access a first page non-volatile data storage (e.g. Page 170) in Shared Non-Volatile Data Storage Drives 106. First Lock Request 304 indicates both the first page of non-volatile data storage and an extent of non-volatile data storage (e.g. Extent 168) that contains the first page of non-volatile data storage. For example, First Lock Request 304 may contain the LBA of Page 170 and the extent number of Extent 168.

At 306, Node B 104 processes First Lock Request 304. For example, at 306 Node B 104 may determine that Per-Extent Lock Table 158 includes no extent lock entry corresponding to Extent 168, e.g. because no page in Extent 168 has previously been accessed. In response to determining that no extent lock entry corresponding to Extent 168 is present in Per-Extent Lock Table 158, Node B 104 sends a first extent lock grant message to Node A 102, e.g. First Extent Lock Grant 308. First Extent Lock Grant 308 is responsive to First Lock Request 304, and includes at least an indication that the extent lock for Extent 168 is granted to Node A 102.

Node A 102 receives First Extent Lock Grant 308, and in response to First Extent Lock Grant 308, at 310, modifies the extent lock entry corresponding to Extent 168 in Per-Extent Lock Table 130 to indicate that the extent lock for Extent 168 is currently held by Node A 102. For example, Node A 102 may modify the extent lock entry corresponding to Extent 168 in Per-Extent Lock Table 130 to contain a State value of ExtentLocked, and an Access Level of EXCLUSIVE, thus storing an indication in the extent lock entry that the extent lock for Extent 168 is currently held by Node A 102.

At 312, in response to the First Extent Lock Grant 308, Node A 102 accesses multiple pages within Extent 168 without further contacting Node B 104. For example, at 312, Node A 102 may access both Page 170 and Page 171 in response to First Extent Lock Grant 308, without contacting Node B 104 subsequent to receipt of First Extent Lock Grant 308, e.g. based on the indication stored in the extent lock entry corresponding to Extent 168 in Per-Extent Lock Table 130 that the extent lock for Extent 168 is currently held by Node A 102 (e.g. State=ExtentLocked and Access Level=EXCLUSIVE). By modifying the State of the extent lock entry corresponding to Extent 168 to have a value of ExtentLocked, Node A 102 modifies the extent lock entry to indicate that Extent 168 is currently being accessed in extent-locked access mode. By modifying the Access Level of the extent lock entry corresponding to Extent 168 to have a value of EXCLUSIVE, Node A 102 modifies the extent lock entry to indicate that Node A 102 currently has exclusive access to Extent 168.

When at step 312 Node A 102 accesses pages in Extent 168 while State=ExtentLocked and Access Level=EXCLUSIVE in the extent lock entry corresponding to Extent 168 in Per-Extent Lock Table 130, Node A 102 is accessing pages in Extent 168 while Extent 168 is in the extent-locked access mode. For each page in Extent 168 that is accessed by Node A 102 at step 312 in FIG. 3 while Extent 168 is being accessed in the extent-locked access mode, Node A 102 modifies the corresponding page lock entry in Per-Page Lock Table 124 to indicate that the page lock for the page is currently held by Node A 102. In each such page lock entry in Per-Page Lock Table 124, Node A 102 also stores the current value of Generation Number 122. For example, at step 312 in FIG. 3 Node A 102 modifies the page lock entries corresponding to Page 170 and Page 171 in Per-Page Lock Table 124 to indicate that the page locks for Page 170 and Page 171 are currently held by Node A 102, and also stores the current value of Generation Number 122 into those page lock entries in Per-Page Lock Table 124. Each time Node A 102 accesses any one of the pages in Extent 168 while Extent 168 is in the extent-locked access mode, Node A 102 also stores the time at which the access was performed into the Local Access Timestamp of the extent lock entry corresponding to Extent 168 in Per-Extent Lock Table 130.

As also shown in FIG. 3, Node B 104 sends a second lock request message to Node A 102, e.g. Second Lock Request 314. Second Lock Request 314 requests permission for Node B 104 to exclusively access a third page of non-volatile data storage that is also contained within Extent 168, e.g. Page 172.

Second Lock Request 314 indicates both Page 172 and Extent 168. For example, Second Lock Request 314 may contain the LBA of Page 172 and the extent number of Extent 168. At step 316, Node A 102 processes Second Lock Request 314. For example, at step 316 Node A 102 may determine an amount of time that has elapsed since Node A 102 last accessed Extent 168 by subtracting the current value of Local Access Timestamp in the extent lock entry corresponding to Extent 168 in Per-Extent Lock Table 130 from the time at which Second Lock Request 314 was received by Node A 102. Node A 102 may then determine whether the amount of time that has elapsed since Node A 102 last accessed Extent 168 exceeds a threshold period of time, e.g. 300 seconds. In the example of FIG. 3, at step 316 Node A 102 determines that less than the threshold period of time has elapsed since Extent 168 was last accessed Node A 102. In response to determining at step 316 that less than the threshold period of time has elapsed since Extent 168 was last accessed Node A 102, at step 318 Node A 102 i) modifies the extent lock entry corresponding to Extent 168 in Per-Extent Lock Table 130 to include an indication that Extent 168 is currently being accessed in page-locked access mode (e.g. State=PageLocked), ii) modifies a page lock entry corresponding to Page 172 in Per-Page Lock Table 124 to include an indication that a page lock for Page 172 is currently held by Node B 104, and iii) sends a page lock grant message, e.g. Page Lock Grant 320, from Node A 102 to Node B 104 granting the page lock for Page 172 to Node B 104.

At step 326, after modifying the extent lock entry corresponding to Extent 168 in Per-Extent Lock Table 130 in to include an indication that Extent 168 is currently being accessed in page-locked access mode, Node A 102 accesses Page 170 and Page 171 within Extent 168 without contacting Node B 104, based on the indications that the page locks for Page 170 and Page 171 are currently held by Node 102 that were previously included by Node A 102 at step 312 (while Extent 168 was being accessed by Node A 102 while Extent 168 was in the extent-locked access mode and the extent lock for Extent 168 was held by Node A 102) in the page lock entries corresponding to Page 170 and Page 171 in Per-Page Lock Table 130.

After modifying the extent lock entry corresponding to Extent 168 in Per-Extent Lock Table 130 at step 318 to include an indication that Extent 168 is currently being accessed in page-locked access mode (State=PageLocked), Node A 102 only accesses pages within Extent 168 without contacting Node B 104 based on indications of page locks held by Node A 102 in Per-Page Lock Table 124 that are indicated by entries of Per-Page Lock Table 124 that also contain generation numbers that match the Generation Number stored in the extent lock entry corresponding to Extent 168 in Per-Extent Lock Table 130. For pages within Extent 168 having corresponding page lock entries in Per-Page Lock Table 124 that do not contain a generation number that matches the Generation number stored in the extent lock entry corresponding to Extent 168 in Per-Extent Lock Table 130, at step 328 Node A 102 negotiates with Node B 104 for the necessary page locks. In other words, when Extent 168 is being accessed in page-locked access mode, Node A 102 must send lock request messages to Node B 104 for any pages within Extent 168 for which Node A 102 does not currently hold the page lock, and for any pages for which the corresponding page lock entry in Per-Page Lock Table 124 indicates that Node A 102 currently holds the page lock, but that do not also contain a generation number that matches the current Generation Number in the extent lock entry corresponding to Extent 168 in Per-Page Lock Table 130.

At some point in time after step 318, during which the extent lock entry corresponding to Extent 168 was modified to indicate that Extent 168 is currently being accessed in page-locked access mode, Node B 104 sends a third lock request message to Node A 102, shown in FIG. 3 by Third Lock Request 330. Third Lock Request 330 requests permission for Node B 104 to access a fourth page contained within Extent 168, e.g. Page 173. Third Lock Request 330 indicates both Page 173 and Extent 168. For example, Third Lock Request 330 includes the LBA of Page 173 and the extent number of Extent 168. In response to receipt of Third Lock Request 330, Node A 102 processes Third Lock Request 330 at step 332, and determines whether at least the threshold period of time has elapsed since any page within Extent 168 was last accessed by Node A 102. For example, Node A 102 may again determine the amount of time that has elapsed since Node A 102 last accessed Extent 168 by subtracting the current value of Local Access Timestamp in the extent lock entry corresponding to Extent 168 in Per-Extent Lock Table 130 from the time at which Third Lock Request 330 was received by Node A 102. In response to determining at step 332 that at least the threshold period of time (e.g. 300 seconds) has elapsed since Extent 168 was last accessed by Node A 102, Node A 102 i) at step 334 modifies the extent lock entry corresponding to Extent 168 in Per-Extent Lock Table 130 to include an indication that the extent lock for Extent 168 is currently held by the second node (State=ExtentLocked, Access Level=None), ii) at step 336 increments the Generation Number 122, and iii) sends a second extent lock grant message, e.g. Second Extent Lock Grant 338 from Node A 102 to Node B 104 granting the extent lock on Extent 168 to Node B 104. Accordingly, in response to receipt of the Third Lock Request 330 and to determining at step 332 that at least the threshold period of time has elapsed since Extent 168 was last accessed by Node A 102, Node A 102 may modify the extent lock entry corresponding to Extent 168 in Per-Extent Lock Table 130 to include an indication that Extent 168 is currently being accessed in extent-locked access mode and that Node A 102 currently has no access to Extent 168.

Figure 4:
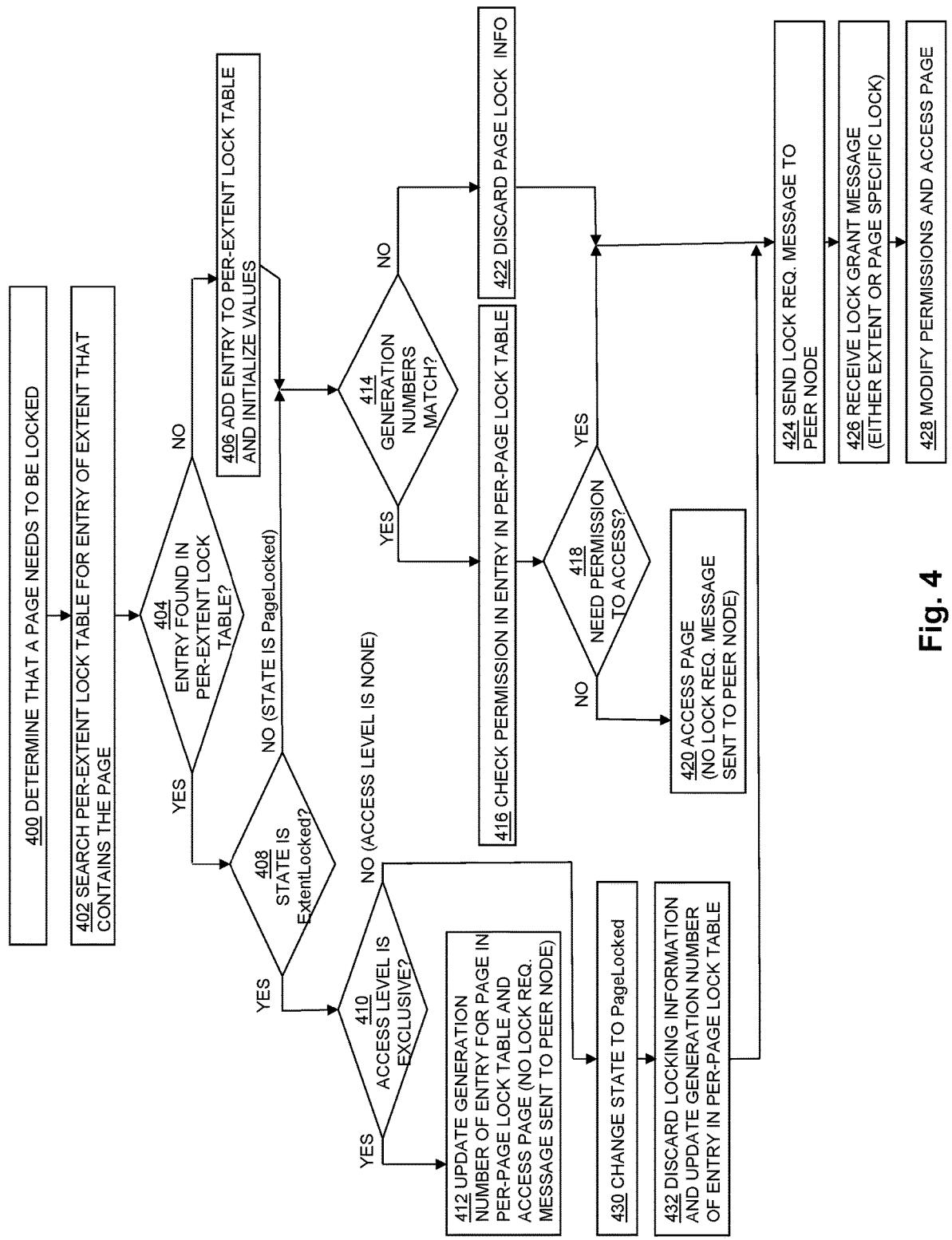
FIG. 4 is a flow chart showing an example of steps that may be performed by a node to determine whether a lock request message is sent to another node when accessing shared non-volatile data storage in a multi-node data storage system in some embodiments.

FIG. 4 is a flow chart showing an example of steps that may be performed by a node to determine whether a lock request message is sent to another node when accessing shared non-volatile data storage in a multi-node data storage system in some embodiments. The steps of FIG. 4 may, for example, be performed in some embodiments by the lock request generation logic of a node of the multi-node data storage system, e.g. by Lock Request Generation Logic 116 in Node A 102 or Lock Request Generation Logic 144 in Node B 104.

At 400, a determination is made that a page needs to be locked. For example, the host I/O processing logic of the node may need to lock a page in order to store user data received in one or more host I/O requests. At step 402, the per-extent lock table of the node is searched for an extent lock entry corresponding to the extent that contains the page that needs to be locked. At 404, a determination is made as to whether the per-extent lock table of the node contains an extent lock entry corresponding to the extent that contains the page that needs to be locked. For example, the per-extent lock table may not contain an extent lock entry corresponding to a given extent in the case where the extent has not previously been accessed, or in the case where an extent lock entry corresponding to the extent was reclaimed (i.e. deleted from the per-extent lock table) in response to a need to reduce the total number of entries in the per-extent lock table, e.g. in order to limit the total size of the per-extent lock table.

In the case where the per-extent lock table contains an extent lock entry corresponding to the extent that contains the page that needs to be locked, step 404 is followed by step 408. Otherwise, in the case where the per-extent lock table does not contain an extent lock entry corresponding to the extent that contains the page that needs to be locked, step 404 is followed by step 406.

At step 408, a determination is made as to whether the extent lock entry corresponding to the extent that contains the page that needs to be locked has a State value of ExtentLocked. In the case where the extent lock entry corresponding to the extent that contains the page that needs to be locked has a State value of ExtentLocked, step 408 is followed by step 410. Otherwise, in the case where the extent lock entry corresponding to the extent that contains the page that needs to be locked has a State value of PageLocked, step 408 is followed by step 414.

At step 410, a determination is made as to whether the extent lock entry corresponding to the extent that contains the page that needs to be locked has an Access Level value of Exclusive. If the extent lock entry corresponding to the extent that contains the page that needs to be locked has an Access Level value of Exclusive, step 410 is followed by step 412. Otherwise, if the extent lock entry corresponding to the extent that contains the page that needs to be locked has an Access level of None, then step 410 is followed by step 430.

At step 412, the node has determined that it holds the extent lock on the extent, and can therefore access the needed page without having to send a lock request message to the other node. Accordingly, at step 412 the page lock entry in the per-page lock table corresponding to the page that needs to be locked is modified if necessary, to indicate that the node holds the page lock for the needed page, and the current value of the generation number for the node is written to the page lock entry in the per-page lock table corresponding to the page.

At step 430, the value of the State field in the extent lock entry corresponding to the extent that contains the page that needs to be locked is changed to PageLocked. Step 430 is followed by step 432, in which any locking information stored in the page lock entry corresponding to the page that needs to be locked is discarded, and the current value of the generation number for the node is written to the page lock entry corresponding to the page.

Step 432 is followed by step 424, in which a lock request message is sent from the node to the peer node in the data storage system. The lock request message indicates both the page that needs to be locked and the extent that contains the page that needs to be locked.

Step 424 is followed by step 426, in which the node receives a lock grant message from the other node. The lock grant message received at step 426 may be an extent lock grant, or a page lock grant. Step 426 is followed by step 428. In step 428, if the lock grant message was an extent lock grant, then at step 428 the node modifies the extent lock entry for the extent to indicate that the extent is now owned by the node, e.g. by modifying the extent lock entry to have a State field value of ExtentLocked, and an Access Level field value of Exclusive, and also modifies the page lock entry for the page i) to indicate that the page lock for the page is now held by the node and ii) to store a copy of the current value of the node's generation number. Alternatively, if the lock grant message received at step 426 was a page lock grant, then at step 428 the node modifies the page lock entry for the page to indicate that the page lock for the page is now held by the node, and modifies the State field of the extent lock entry to have a value of PageLocked if necessary. The page can then be accessed by the node, e.g. to store user data.

At step 406 an entry for the extent that contains the page that needs to be accessed is added to the per-extent lock table. The initial values for the fields of the extent lock entry may be State=PageLocked, Access Level=None, Generation Number=current generation number of the node plus one, and Local Access Timestamp=0. Step 406 is followed by step 414.

At step 414 a determination is made as to whether a generation number stored in the page lock entry corresponding to the page that needs to be accessed matches the value of the Generation Number field in the extent lock entry corresponding to the extent that contains the page. If there is a match, then step 414 is followed by step 416. Otherwise, if there is not a match, then step 414 is followed by step 422.

At step 416, permissions are checked in the page lock entry corresponding to the page that needs to be accessed in the per-page lock table, in order to determine at step 418 whether the page lock for the page is currently held by the node (i.e. to determine whether the node needs permission from the other node to access the page). If the page lock for the page is currently held by the node, then the node does not need to request permission from the other node to access the page, and step 418 is followed by step 420, in which the page is then accessed by the node, e.g. to store user data, without sending a lock request message to the other node. Otherwise, if the lock for the page is not currently held by the node, then the node does need to request permission from the other node to access the page, and step 418 is followed by step 424.

In step 422, because the generation number stored in the page lock entry does not match the value of the Generation Number field of the extent lock entry, the page lock information stored in the page lock entry is invalid and is therefore discarded, and step 422 is then followed by step 424, in which a lock request message is sent to the other node.

Figure 5:
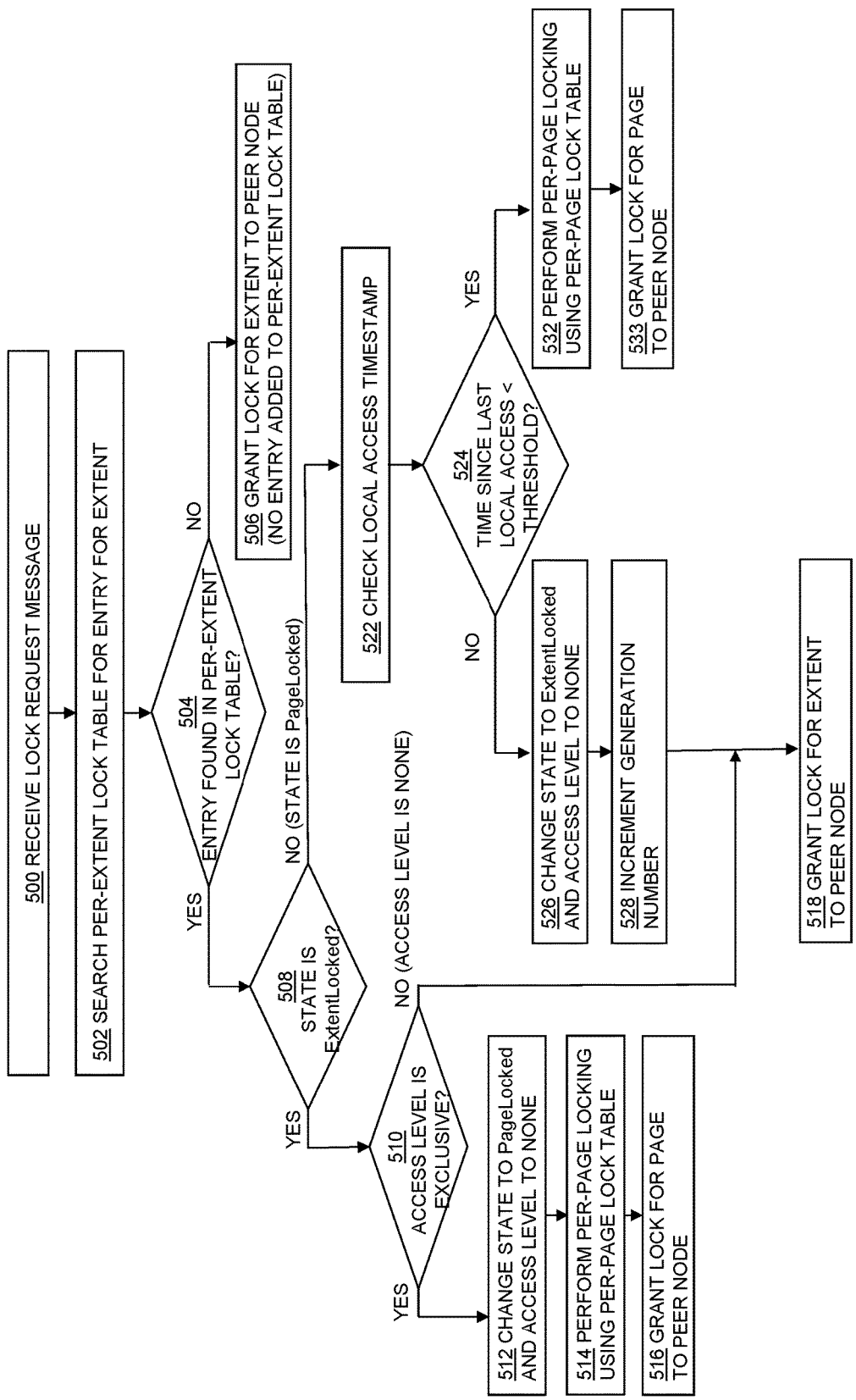
FIG. 5 is a flow chart showing an example of steps that may be performed by a node during processing of a lock request received from another node in a multi-node data storage system in some embodiments.

FIG. 5 is a flow chart showing an example of steps that may be performed by a node during processing of a lock request received from another node in a multi-node data storage system in some embodiments. The steps of FIG. 5 may, for example, be performed in some embodiments by the lock request processing logic of a node of the multi-node data storage system, e.g. by Lock Request Processing Logic 118 in Node A 102 or Lock Request Processing Logic 148 in Node B 104.

At step 500 a lock request message is received. The lock request message indicates both a page that needs to be locked by the other node and the extent that contains the page that needs to be locked. At step 502 the per-extent lock table is searched for an extent lock entry corresponding to the extent that contains the page that needs to be locked. At 504, a determination is made as to whether the per-extent lock table of the node contains an extent lock entry corresponding to the extent that contains the page that needs to be locked. In the case where the per-extent lock table contains an extent lock entry corresponding to the extent that contains the page that needs to be locked, step 504 is followed by step 508. Otherwise, in the case where the per-extent lock table does not contain an extent lock entry corresponding to the extent that contains the page that needs to be locked, step 504 is followed by step 506.

At step 506, an extent lock grant message is sent to the other node granting the extent lock on the extent that contains the page that needs to be locked to the other node. No extent lock entry needs to be added to the per-extent lock table.

At step 508, a determination is made as to whether the State field in the extent lock entry corresponding to the extent that contains the page that needs to be locked by the other node has a value of ExtentLocked. In the case where the State field in the extent lock entry corresponding to the extent that contains the page that needs to be locked by the other node has a value of ExtentLocked, step 508 is followed by step 510. Otherwise, in the case where the State field in the extent lock entry corresponding to the extent that contains the page that needs to be locked by the other node has a value of PageLocked, step 508 is followed by step 522.

At step 510, a determination is made as to whether the Access Level field in the extent lock entry corresponding to the extent that contains the page that needs to be locked by the other node has a value of EXCLUSIVE. In the case where the Access Level field in the extent lock entry corresponding to the extent that contains the page that needs to be locked by the other node has a value of EXCLUSIVE, step 510 is followed by step 512. Otherwise, in the case where the Access Level field in the extent lock entry corresponding to the extent that contains the page that needs to be locked by the other node has a value of NONE, step 510 is followed by step 518, in which an extent lock grant message is sent to the other node granting the extent lock for the extent that contains the page that needs to be locked by the other node to the other node.

At step 512, the value of the State field in the extent lock entry corresponding to the extent that contains the page that needs to be locked by the other node is set to PageLocked. Also in step 512, the value of the Access Level field in the extent lock entry corresponding to the extent that contains the page that needs to be locked by the other node is set to NONE. Step 512 is followed by step 514.

At step 514, the node performs per-page locking for the page that needs to be locked by the other node using the contents of the per-page lock table in the node. When the lock on the page that needs to be locked by the other node can be granted to the other node, step 514 is followed by step 516, in which a page lock grant message is sent to the other node granting the lock for the page that needs to be locked by the other node to the other node.

At step 522, the value of the Local Access Timestamp field in the extent lock entry corresponding to the extent that contains the page that needs to be locked by the other node is checked. Step 522 is followed by step 524.

At step 524, a determination is made as to whether the amount of time that has elapsed since the extent that contains the page that needs to be locked by the other node was last accessed by the node is at least as large as a predetermined threshold period of time. In the case where the amount of time that has elapsed since the extent that contains the page that needs to be locked by the other was last accessed by the node is at least as large as the predetermined threshold period of time, step 524 is followed by step 532. Otherwise, in the case where the amount of time that has elapsed since the extent that contains the page that needs to be locked by the other was last accessed by the node is not as large as the predetermined threshold period of time, step 524 is followed by step 526.

At step 532, the node performs per-page locking for the page that needs to be locked by the other node using the contents of the per-page lock table in the node. When the lock on the page that needs to be locked by the other node can be granted to the other node, step 532 is followed by step 533, in which a page lock grant message is sent to the other node granting the lock for the page that needs to be locked by the other node to the other node.

At step 526, the value of the State field in the extent lock entry corresponding to the extent that contains the page that needs to be locked by the other node is set to ExtentLocked. Also in step 526, the value of the Access Level field in the extent lock entry corresponding to the extent that contains the page that needs to be locked by the other node is set to NONE. Step 526 is followed by step 528, in which the generation number of the node is incremented. Step 528 is followed by step 518, in which an extent lock grant message is sent to the other node granting the extent lock for the extent that contains the page that needs to be locked by the other node to the other node.

Figure 6:
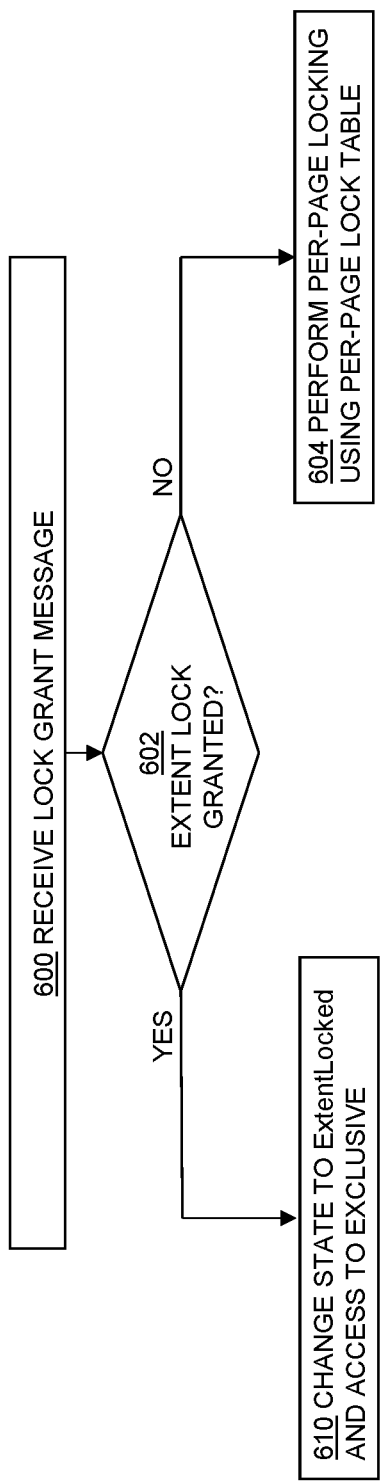
FIG. 6 is flow chart showing an example of steps that may be performed by a node during processing of a lock reply message received from another node in a multi-node data storage system in some embodiments.

FIG. 6 is flow chart showing an example of steps that may be performed by a node during processing of a lock reply message received from another node in a multi-node data storage system in some embodiments. The steps of FIG. 6 may, for example, be performed in some embodiments by the lock grant processing logic of a node of the multi-node data storage system, e.g. by Lock Grant Processing Logic 120 in Node A 102 or Lock Grant Processing Logic 144 in Node B 104.

At step 600, a lock grant message is received from the other node. At step 602, a determination is made as to whether the lock grant message contains a grant of an extent lock. If the received lock grant message contains grants an extent lock, then step 602 is followed by step 610. Otherwise, if the received lock grant message contains a page lock, then step 602 is followed by step 604.

At step 602, the extent lock entry corresponding to the extent for which the extent lock is granted by the received lock grant message is modified such that the value of the State field is set to ExtentLocked, and the value of the Access Level field is set to EXCLUSIVE.

At step 604, the node performs per-page locking using the per-page lock table. For example, the node may modify the page lock entry corresponding to the page for which a page lock is granted by the received lock grant message to indicate that the page lock for the page is currently held by the node. In addition, in the case where the value of the State field in the extent lock entry corresponding to the extent that contains the page for which the page lock was granted is currently ExtentLocked, the value of the State field in the extent lock entry corresponding to the extent that contains the page for which the page lock was granted may be updated to PageLocked.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
sending, from a first node in a data storage system to a second node in the data storage system, a first lock request message, wherein the first lock request message requests permission to access a first page of non-volatile data storage, and wherein the first lock request message indicates both the first page of non-volatile data storage and an extent of non-volatile data storage that contains the first page of non-volatile data storage;
receiving, by the first node from the second node, a first extent lock grant message granting a lock on the extent of non-volatile data storage to the first node;
accessing, by the first node in response to the first extent lock grant message, the first page of non-volatile data storage and at least a second page of non-volatile data storage that is also contained within the extent of non-volatile data storage;
locating an extent lock entry corresponding to the extent of non-volatile data storage in a per-extent lock table in the first node;
in response to the first extent lock grant message, modifying the extent lock entry corresponding to the extent of non-volatile data storage in the per-extent lock table in the first node to include an indication that an extent lock for the extent of non-volatile data storage is currently held by the first node; and wherein the accessing of both the first page of non-volatile data storage and the second page of non-volatile data storage contained within the extent of non-volatile data storage by the first node in response to the first extent lock grant message is performed by the first node in response to the indication included in the extent lock entry corresponding to the extent of non-volatile data storage that the extent lock for the extent of non-volatile data storage is currently held by the first node.

2. The method of claim 1, wherein the extent of non-volatile data storage is one of a plurality of extents of non-volatile data storage within the data storage system that are shared by the first node and the second node.

3. The method of claim 2, wherein the accessing of both the first page of non-volatile data storage and the second page of non-volatile data storage contained within the extent of non-volatile data storage in response to the first extent lock grant message is performed by the first node without the first node sending a lock request message to the second node subsequent to receipt of the first extent lock grant message from the second node by the first node.

4. The method of claim 1, wherein modifying the extent lock entry corresponding to the extent of non-volatile data storage to include the indication that the extent lock for the extent of non-volatile data storage is currently held by the first node includes modifying the extent lock entry corresponding to the extent of non-volatile data storage to indicate that the extent of non-volatile data storage is currently being accessed in extent-locked mode, and that the first node currently has exclusive access to the extent of non-volatile data storage.

5. The method of claim 4, wherein the accessing of both the first page of non-volatile data storage and the second page of non-volatile data storage contained within the extent of non-volatile data storage by the first node in response to the first extent lock grant message includes modifying a page lock entry corresponding to the first page of non-volatile data storage in a per-page lock table in the first node to include an indication that a page lock for the first page of non-volatile data storage is currently held by the first node and modifying a page lock entry corresponding to the second page of non-volatile data storage in the per-page lock table in the first node to include an indication that a page lock for the second page of non-volatile data storage is currently held by the first node.

6. The method of claim 5, further comprising:
maintaining an extent lock generation number within the first node;
wherein modifying the extent lock entry corresponding to the extent of non-volatile data storage to include the indication that the extent lock for the extent of non-volatile data storage is currently held by the first node further includes storing a copy of the current value of the generation number maintained within the first node in the extent lock entry corresponding to the extent of non-volatile data storage;
wherein modifying the page lock entry corresponding to the first page of non-volatile data storage in a per-page lock table in the first node to include the indication that the page lock for the first page of non-volatile data storage is currently held by the first node further includes storing a copy of the current value of the generation number maintained within the first node in the page lock entry corresponding to the first page of non-volatile data storage in the per-page lock table in the first node; and wherein modifying the page lock entry corresponding to the second page of non-volatile data storage in the per-page lock table in the first node to include the indication that the page lock for the second page of non-volatile data storage is currently held by the first node further includes storing the current value of the generation number maintained within the first node in the page lock entry corresponding to the second page of non-volatile data storage in the per-page lock table in the first node.

7. The method of claim 6, further comprising:
incrementing the extent lock generation number within the first node each time an extent lock grant message is transmitted from the first node to the second node.

8. The method of claim 7, further comprising:
receiving, by the first node from the second node, a second lock request message, wherein the second lock request message requests permission to access a third page of non-volatile data storage contained within the extent of non-volatile data storage, and wherein the second lock request message indicates both the third page of non-volatile data storage and the extent of non-volatile data storage; and in response to the second lock request message, determining whether at least a threshold period of time has elapsed since the extent of non-volatile data storage was last accessed by the first node; and in response to determining that less than the threshold period of time has elapsed since the extent of non-volatile data storage was last accessed by the first node:
modifying the extent lock entry corresponding to the extent of non-volatile data storage in the per-extent lock table in the first node to include an indication that the extent of non-volatile data storage is currently being accessed in page-locked access mode,
modifying a page lock entry corresponding to the third page of non-volatile data storage in the per-page lock table in the first node to include an indication that a page lock for the third page of non-volatile data storage is currently held by the second node, and
sending a page lock grant message from the first node to the second node granting the page lock for the third page of non-volatile data storage to the second node.

9. The method claim 8, further comprising:
after modifying the extent lock entry corresponding to the extent of non-volatile data storage in the per-extent lock table in the first node to include an indication that the extent of non-volatile data storage is currently being accessed in page-locked access mode, the first node accesses the first page and the second page within the extent of non-volatile data storage without contacting the second node based on the indications the page locks for the first page and the second page are currently held by the first node that were previously included in the per-page locking table in the first node.

10. The method of claim 9, wherein after modifying the extent lock entry corresponding to the extent of non-volatile data storage in the per-extent lock table in the first node to include an indication that the extent of non-volatile data storage is currently being accessed in page-locked access mode, the first node only accesses pages within the extent of non-volatile data storage without contacting the second node based on indications of per-page locks held by the first node that are contained in the per-page locking table in the first node within entries of the per-page locking table in the first node that also contain generation numbers that match the generation number stored in the extent lock entry corresponding to the extent of non-volatile data storage.

11. The method of claim 10, further comprising:
receiving, by the first node from the second node, a third lock request message, wherein the third lock request message requests permission to access a fourth page of non-volatile data storage contained within the extent of non-volatile data storage, and wherein the third lock request message indicates both the fourth page of non-volatile data storage and the extent of non-volatile data storage; and
in response to the third lock request message, determining whether at least the threshold period of time has elapsed since the extent of non-volatile data storage was last accessed by the first node; and
in response to determining that at least the threshold period of time has elapsed since the extent of non-volatile data storage was last accessed by the first node:
modifying the extent lock entry corresponding to the extent of non-volatile data storage in the per-extent lock table in the first node to include an indication that the extent lock for the extent of non-volatile data storage is currently held by the second node,
incrementing the extent lock generation number within the first node, and
sending a second extent lock grant message from the first node to the second node granting the extent lock on the extent of non-volatile data storage to the second node.

12. The method of claim 11, wherein modifying the extent lock entry corresponding to the extent of non-volatile data storage in the per-extent lock table in the first node to include the indication that the extent lock for the extent of non-volatile data storage is currently held by the second node includes modifying the extent lock entry corresponding to the extent of non-volatile data storage in the per-extent lock table in the first node to include an indication that the extent of non-volatile data storage is currently being accessed in extent-locked access mode and an indication that the first node has no access to the extent of non-volatile data storage.

13. A multi-node data storage system comprising:
a plurality of nodes, each node including processing circuitry and a memory, the plurality of nodes including a first node and a second node;
a plurality of non-volatile data storage drives communicably coupled to the plurality of nodes; and
wherein the memory of the nodes has program code stored thereon, wherein the program code, when executed by the processing circuitry of the nodes, is configured to:
send, from the first node to the second node, a first lock request message, wherein the first lock request message requests permission to access a first page of non-volatile data storage, and wherein the first lock request message indicates both the first page of non-volatile data storage and an extent of non-volatile data storage that contains the first page of non-volatile data storage,
receive, by the first node from the second node, a first extent lock grant message granting a lock on the extent of non-volatile data storage to the first node,
access, by the first node in response to the first extent lock grant message, the first page of non-volatile data storage and at least a second page of non-volatile data storage that is also contained within the extent of non-volatile data storage,
locate an extent lock entry corresponding to the extent of non-volatile data storage in a per-extent lock table in the first node;
in response to the first extent lock grant message, modify the extent lock entry corresponding to the extent of non-volatile data storage in the per-extent lock table in the first node to include an indication that an extent lock for the extent of non-volatile data storage is currently held by the first node, and
wherein the access of both the first page of non-volatile data storage and the second page of non-volatile data storage contained within the extent of non-volatile data storage by the first node in response to the first extent lock grant message is performed by the first node in response to the indication included in the extent lock entry corresponding to the extent of non-volatile data storage that the extent lock for the extent of non-volatile data storage is currently held by the first node.

14. A computer program product including a non-transitory computer readable medium having instructions stored thereon, wherein the instructions, when executed on processing circuitry, cause the processing circuitry to perform the steps of:
sending, from a first node in a data storage system to a second node in the data storage system, a first lock request message, wherein the first lock request message requests permission to access a first page of non-volatile data storage, and wherein the first lock request message indicates both the first page of non-volatile data storage and an extent of non-volatile data storage that contains the first page of non-volatile data storage;
receiving, by the first node from the second node, a first extent lock grant message granting a lock on the extent of non-volatile data storage to the first node;
accessing, by the first node in response to the first extent lock grant message, the first page of non-volatile data storage and at least a second page of non-volatile data storage that is also contained within the extent of non-volatile data storage;
locating an extent lock entry corresponding to the extent of non-volatile data storage in a per-extent lock table in the first node;
in response to the first extent lock grant message, modifying the extent lock entry corresponding to the extent of non-volatile data storage in the per-extent lock table in the first node to include an indication that an extent lock for the extent of non-volatile data storage is currently held by the first node; and
wherein the accessing of both the first page of non-volatile data storage and the second page of non-volatile data storage contained within the extent of non-volatile data storage by the first node in response to the first extent lock grant message is performed by the first node in response to the indication included in the extent lock entry corresponding to the extent of non-volatile data storage that the extent lock for the extent of non-volatile data storage is currently held by the first node.

* * * * *